United States Patent
Moore

(10) Patent No.: US 9,989,773 B2
(45) Date of Patent: Jun. 5, 2018

(54) MULTI-CHANNEL WIDE FIELD IMAGING SYSTEM AND OPTICAL SYSTEM FOR USE THEREIN

(71) Applicant: NOVADAQ TECHNOLOGIES INC., Mississauga (CA)

(72) Inventor: Frederick Allen Moore, Vancouver (CA)

(73) Assignees: NOVADAQ TECHNOLOGIES, INC., Mississauga, Ontario (CA); NOVADAQ CORP., Mississauga, Ontario (CA)

( * ) Notice: Subject to any disclaimer, the term of this patent is extended or adjusted under 35 U.S.C. 154(b) by 0 days. days.

(21) Appl. No.: 15/083,357

(22) Filed: Mar. 29, 2016

(65) Prior Publication Data

US 2016/0291332 A1    Oct. 6, 2016

Related U.S. Application Data

(60) Provisional application No. 62/140,045, filed on Mar. 30, 2015.

(51) Int. Cl.

| | |
|---|---|
| *G02B 13/16* | (2006.01) |
| *G02B 27/10* | (2006.01) |
| *G02B 13/04* | (2006.01) |
| *G02B 13/22* | (2006.01) |
| *G02B 27/14* | (2006.01) |
| *H04N 5/225* | (2006.01) |
| *H04N 9/09* | (2006.01) |
| *H04N 9/04* | (2006.01) |
| *H04N 9/097* | (2006.01) |
| *H04N 9/07* | (2006.01) |

(52) U.S. Cl.
CPC ......... *G02B 27/1013* (2013.01); *G02B 13/04* (2013.01); *G02B 13/22* (2013.01); *G02B 27/141* (2013.01); *H04N 5/2258* (2013.01); *H04N 9/045* (2013.01); *H04N 9/09* (2013.01); *H04N 9/097* (2013.01)

(58) Field of Classification Search
CPC ........ H04N 5/2258; H04N 9/045; H04N 9/09; H04N 9/097; G02B 27/106; G02B 27/1013; G02B 27/141
USPC ......................................... 348/335, 336, 337
See application file for complete search history.

(56) References Cited

U.S. PATENT DOCUMENTS

| | | |
|---|---|---|
| 5,276,321 A | 1/1994 | Chang et al. |
| 5,561,525 A | 10/1996 | Toyonaga et al. |
| (Continued) | | |

OTHER PUBLICATIONS

International Search Report based on co-pending Canadian International Application No. PCT/CA2016/050365 dated May 31, 2016.

(Continued)

*Primary Examiner* — Ngoc-Yen Vu
(74) *Attorney, Agent, or Firm* — Lee & Morse, P.C.

(57) ABSTRACT

An optical system for use with a multi-channel wide field imaging system, the optical system including an objective lens, a dichroic element to split light into a first wavelength range and a second wavelength range, the dichroic element positioned to receive near parallel chief rays from the objective lens, a first channel lens system to receive light of the first wavelength range from the dichroic element; and a second channel lens system to receive light of the second wavelength range from the dichroic element.

20 Claims, 9 Drawing Sheets

(56) References Cited

U.S. PATENT DOCUMENTS

| | | | |
|---|---|---|---|
| 5,822,128 A | 10/1998 | Sekine | |
| 6,734,966 B2* | 5/2004 | McCarthy | G01J 3/2823 |
| | | | 250/339.05 |
| 7,085,076 B2* | 8/2006 | Sallander | G02B 5/003 |
| | | | 359/738 |
| 7,315,357 B2* | 1/2008 | Ortyn | C12Q 1/6816 |
| | | | 356/318 |
| 7,518,726 B2 | 4/2009 | Rulison et al. | |
| 8,619,184 B2* | 12/2013 | Podoleanu | A61B 3/102 |
| | | | 348/374 |
| 9,547,178 B2* | 1/2017 | Erdogan | G02B 5/26 |
| 9,578,252 B2* | 2/2017 | Laroia | G02B 13/02 |
| 9,648,254 B2* | 5/2017 | Darty | H04N 5/332 |
| 2011/0147615 A1 | 6/2011 | Kintz | |
| 2011/0261175 A1 | 10/2011 | Fomitchov et al. | |

OTHER PUBLICATIONS

International Preliminary Report on Patentability dated Oct. 12, 2017 for PCT Application No. PCT/CA2016/050365.

* cited by examiner

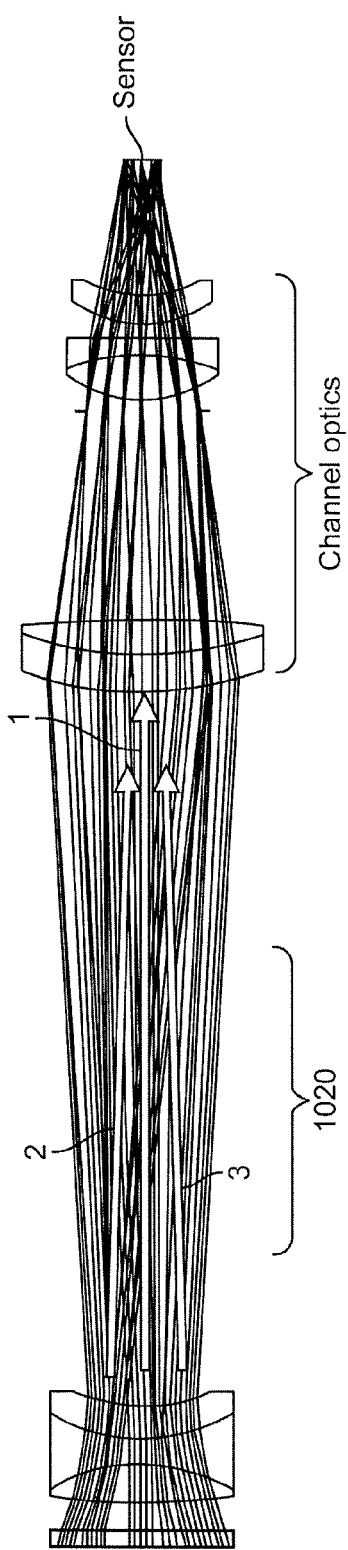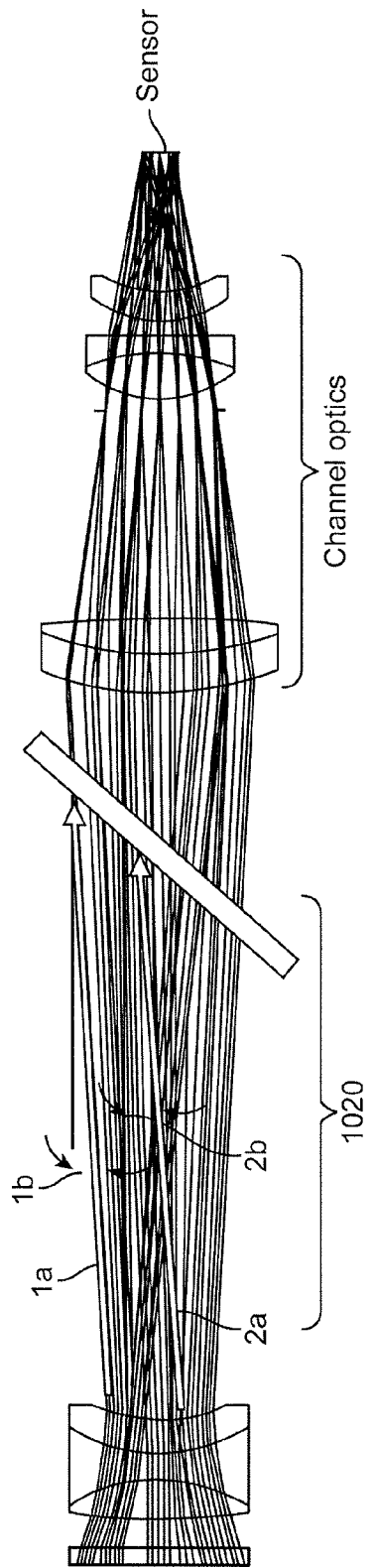
FIG. 2A
FIG. 2B

MULTI-CHANNEL WIDE FIELD IMAGING SYSTEM AND OPTICAL SYSTEM FOR USE THEREIN

CROSS-REFERENCE TO RELATED APPLICATION

The present application claims priority under 35 U.S.C. § 119(e) to U.S. Provisional Application Ser. No. 62/140,045, entitled "Multi-Channel Wide Field Imaging System and Optical System for Use Therein", filed on Mar. 30, 2015, which is hereby incorporated by reference in its entirety for all purposes.

TECHNICAL FIELD

The present disclosure relates generally to the field of optical systems and, specifically, to an optical system for use in an imaging system having multiple image sensors wherein the detected image signal magnitude in some wavelength ranges are orders of magnitude fainter than in other wavelength ranges.

BACKGROUND

An imaging system, such as camera, captures light emission from an object scene and uses the captured light to construct spatial and chromatic representation of the object scene at an image plane. The image may be recorded by a detector or light-sensitive media. Such imaging systems may be characterized by their operating space and their performance within the operating space.

An imaging system's operating space may include, for example, angular field of view, working distance, and spectral bandwidth. An imaging system's performance may include, for example, spatial resolution, relative illumination across the image plane, and system sensitivity to low light conditions.

When an image of an object is formed by an imaging device, such as a camera, the influence of the imaging device on the optical information can be described by various parameters. For example, the image of a point source will be altered according to the imaging device's point spread function (PSF). The PSF characterizes how an imaging device alters the fine details in an object scene when constructing an image scene. An image exhibits aberrations that are brought about by the device and are not otherwise part of the object. More generally, the image field resolution and contrast will be determined by an imaging device's modulation transfer function (MTF). Both the PSF and the MTF may exhibit wavelength dependencies, system aperture geometry dependencies, and aberration dependencies; i.e., MTF may be different for different wavelengths and different for different aperture geometries, and may depend also on the extent to which the final wavefront is diffraction limited or aberration-limited.

The PSF, the MTF, and other such parameters of real imaging systems account for and include diffraction effects and aberration effects. For example, if an aberration is introduced in an imaging system, both the MTF and the PSF may change, decreasing image quality. A system that is aberration limited across the whole field of view may show improved performance when the aperture is reduced. In such a system, however, one wavelength may be predominantly responsible for off-axis performance deterioration.

Some imaging systems exhibit more aberrations off-axis than on-axis and may exploit vignetting to control off-axis aberrations that would otherwise adversely affect image quality. Vignetting involves selectively stopping peripheral rays from reaching the image plane. For example, coma can be reduced by preventing some rays associated with off-axis field positions from reaching the image plane. These rays can be blocked in regions before and/or after the system aperture stop. The rays may be blocked by insertion of a limiting (vignetting) aperture or by under-sizing a lens that is not located at the system aperture stop. However, in systems that image more than one wavelength where different wavelengths have different intensities, such vignetting may reduce too much light at a low intensity wavelength, so that an image for the low intensity wavelength may not be discernible.

SUMMARY

One or more embodiments are directed to an optical system for use with a multi-channel wide field imaging system, the optical system including an objective lens, a dichroic element to split light into a first wavelength range and a second wavelength range, the dichroic element positioned to receive sufficiently parallel chief rays from the objective lens, a first channel lens system to receive light of the first wavelength range from the dichroic element, and a second channel lens system to receive light of the second wavelength range from the dichroic element.

The objective lens may output marginal rays that are within a cone half angle within the specifications of the dichroic element.

The first wavelength range and the second wavelength range may have intensities that differ by at least one order of magnitude.

The second wavelength range may have a lower intensity than the first wavelength range and an aperture stop of the second channel lens system may be larger than an aperture stop in the first channel lens system.

The dichroic element may be before a limiting aperture in the optical system.

The first and second channel lens systems may have separate and independent limiting apertures.

The first and second channel lens systems, in combination with the common objective lens, may have a retro-focus form.

Lens elements of the first and second channel lens systems may have identical lens prescriptions.

The optical system may be image space telecentric.

The optical system may include another dichroic beam splitter in one of the first and second channel lens systems outputting light to a third channel lens system.

Lenses in the first channel lens system, in the second channel lens system, and in the third channel lens system may have identical lens prescriptions.

Each of the second channel lens system and the third channel lens system may have an aperture stop that is larger than an aperture stop in the first channel lens system, aperture stops for the second and third channel lens systems may have a same size.

An aperture stop of the first channel lens system may be a different shape from an aperture stop of the second channel lens system.

The aperture stop of the first channel lens system may be a different size than the aperture stop of the second channel lens system.

The aperture stop of the first channel lens system may have a simple geometric shape, for example a circle, square, or polygon, and the aperture stop of the second channel lens system may be a Fourier aperture.

One or more embodiments are directed to an imaging system that includes an optical system described above and respective sensors in respective channels to detect corresponding wavelength ranges in each channel lens system.

One or more embodiments are directed to a kit, including an objective lens, a dichroic element to split light into a first wavelength range and a second wavelength range, a first channel lens system to receive light of the first wavelength range, and a second channel lens system to receive light of the second wavelength, the first and second channel lens systems having identical lens prescriptions.

The aperture stop of the first channel lens system may be a different shape from an aperture stop of the second channel lens system.

The aperture stop of the first channel lens system may be a different size than the aperture stop of the second channel lens system.

The aperture stop of the first channel lens system may have a simple geometric shape, for example a circle, square, or polygon, and the aperture stop of the second channel lens system may be a Fourier aperture.

One or more embodiments are directed to a method of imaging multi-channel wide field light, the method including providing all light to be imaged incident on a common objective lens, splitting light from the common objective lens by a dichroic element into a first wavelength range and a second wavelength range, the dichroic element being in a position relative to the common objective lens such that the dichroic element receives sufficiently parallel chief rays, providing light of the first wavelength range from the dichroic element to a first channel, and providing light of the second wavelength range from the dichroic element to a second channel.

BRIEF DESCRIPTION OF THE DRAWINGS

Features will become apparent to those of skill in the art by describing in detail exemplary embodiments with reference to the attached drawings in which:

FIGS. 2A and 2B illustrate the light ray paths between the common objective lens and the first element of a channel;

DETAILED DESCRIPTION

Figure 1:
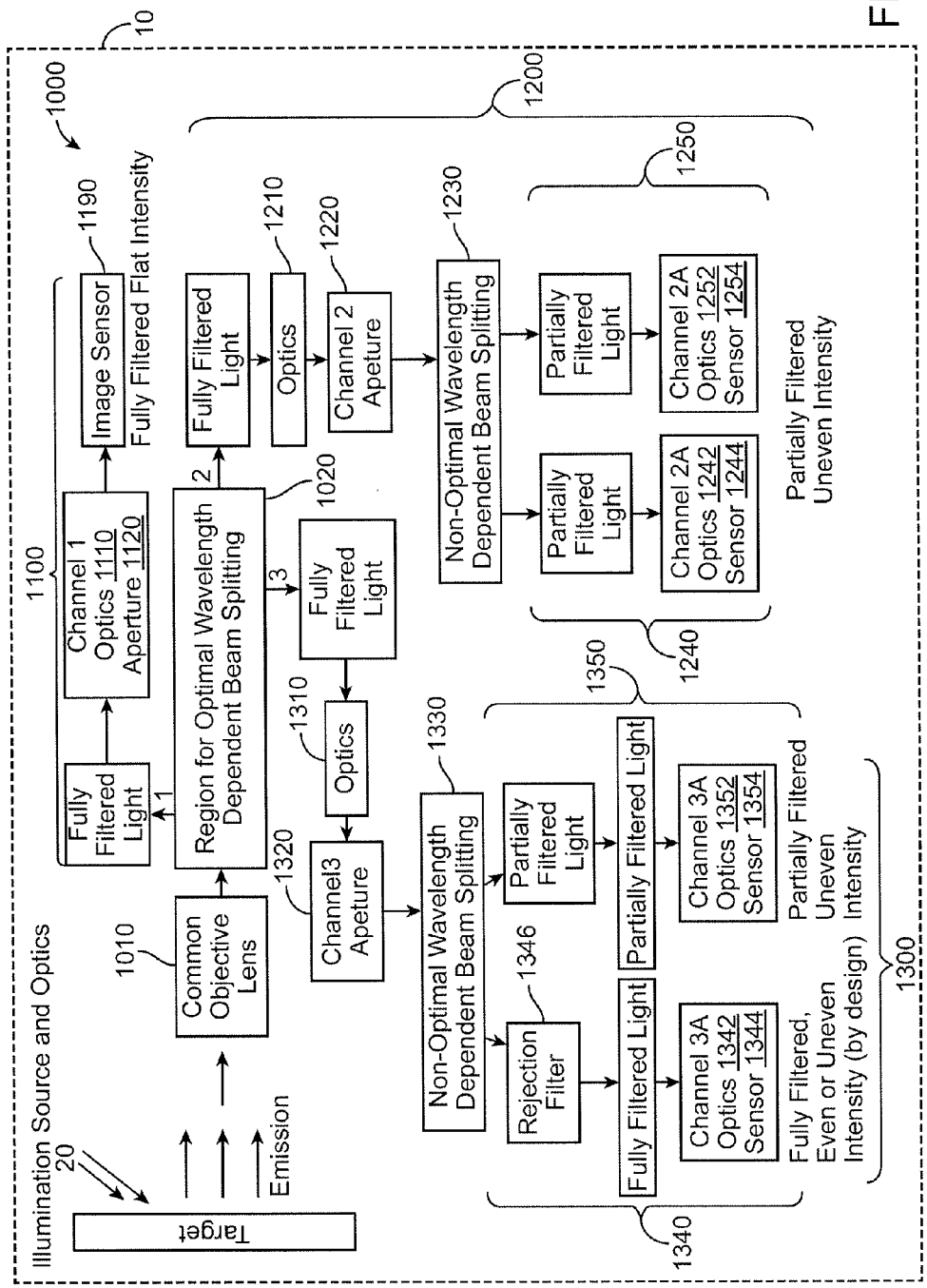
FIG. 1 illustrates a schematic diagram of a multi-channel wide field analysis system in accordance with an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Definitions

"Cross-talk" refers to light that is directed toward, and detected by, an incorrect sensor. The light has followed the correct geometric path, but not the correct chromatic path.

"Fully filtered light" refers to light including only the wavelengths intended for the downstream sensor(s). "Partially filtered light" refers to light including primarily the wavelengths intended for the downstream sensor(s), but with detectable, but acceptable, levels of light not intended for the downstream sensor(s). Due to cost, alignment requirements, and other issues associated with achieving fully filtered light, depending on the particular scenario, partially filtered light may be employed. Light reflected by a filter may be fully filtered while the transmitted beam is not, or vice versa. Also, light that was deemed fully filtered at one junction may be split again at a subsequent junction, after which the outputs may or may not be fully filtered in their subsequent respective paths.

"Parasitic light" refers to any light incident upon a detector that should not be there, regardless of how it was produced and regardless of what path it took.

"Chief ray" refers to a ray launched from a point on the object such that it crosses the system's optical axis at the aperture stop. Each object point emits one chief ray and each chief ray carries a broad range of wavelengths.

"Marginal ray" refers to a ray launched from a point on the object such that is passes through the optical system's aperture at the extreme limit of the aperture. Each object point emits marginal rays that, when they pass through the system stop, scribe a perimeter whose shape and size is equivalent to the stop shape and size. Stopping down the system reduces the acceptance angle subtended by a set of marginal rays emitted at the object plane.

"Lens" is any element with optical power.

Overview

An optical system designed for the human eye may be optimized for the visible spectrum, with particular weight given to the middle, or green, part of the spectrum. However, imaging systems, in which an electronic image sensor is located in an image plane, may operate over a much larger spectral region that may include visible, ultraviolet, near infrared regions, and so forth. The design of an imaging system becomes more complex as its operating bandwidth increases.

In particular, imaging systems that operate over wavelength ranges from different sources, e.g. directly from an illumination source, reflected from or transmitted by an object, direct observation, and so forth, may deal with image signal intensities that vary widely for different wavelength ranges. For example, an image signal in a specific wavelength range and having a relatively large intensity may benefit from some beam correction to improve the image, but an image signal in a wavelength range having a relatively low intensity may not be able to afford loss of light such a correction imposes.

An imaging system according to an embodiment may provide: (a) wavelength-dependent channels that facilitate simultaneous imaging of signals in different spectral regions and having intensities that differ by orders of magnitude; (b) as-detected resolution and contrast that do not vary across the field of view; and (c) chromatic cross-talk eliminated across some or all of the sensors.

In accordance with embodiments, the following constraints inform an optical design for use in such imaging system:

1) The system forms multiple images that are provided as inputs to algorithms. These images are to be read simultaneously in real time, be of near-identical fields-of-view, and be of near-identical distortion and magnification, i.e., the two or more images may be superimposable.

2) The system operates over multiple channels for different wavelength ranges, where some channels exhibit throughput where the signal flux is orders of magnitudes different than other channels, requiring adequate extinction of parasitic light at the low flux sensors and high throughput of low flux light.

3) A beam splitter in the system should minimize or eliminate reflection or transmission dependencies associated with object field position, such as may cause a variation of hue at the image plane.

4) The system should minimize or eliminate channel-dependent magnification errors when the independent sensors are positioned for best focus.

5) The system should minimize or eliminate field response roll-off, i.e., reduce or prevent the as-detected color and intensity of an object feature from varying as the object feature is moved laterally across the field of view, provided the distance to the object and the illumination incident on the object has not changed.

6) When the output from one detector will serve, through post-processing, as the basis for corrective action upon the output from another detector (for example, using the image of laser reflectance to adjust for response variations at other wavelengths as may arise from object-to-hardware distance variations), the after-sampled MTF may be not only invariant across the field, but also invariant across two or more detectors.

In view of the above, in accordance with embodiments, one or more of the following design aspects may be incorporated into an imaging system:

1) The channels may share a common optical axis at the object field and may have nearly identical lens design prescriptions amongst the channels.

2) The high-flux wavelength range(s) may be split out of the beam upstream from the sensors.

3) The beamsplitter separating the high-flux from the low-flux channels may be located after the objective lens and before limiting aperture(s).

4) The beam splitter may split the beams according to wavelength ranges, not power or polarization.

5) The beam splitter may be positioned where the chief rays for all field positions are near-parallel.

6) The region for insertion of the beam splitter may be of an aspect ratio that is favorable to combined specifications of the beam splitter's angle of incidence and incident cone angle (or half angle).

7) The limiting aperture (or f-stop) may be provided with the channel specific optics, not with the shared portion of the optics. For example, the low light channel(s) may have fast f-numbers, while the bright light channel(s) may have slow f-numbers.

8) The image space may be made telecentric, or near-telecentric.

9) There may be no vignetting of off-axis rays.

10) The f-stop for one channel may be selected in order to achieve an as detected MTF similar to that of another channel.

General System

FIG. 1 illustrates a schematic view of a multi-channel imaging system 1000 of an analysis system 10 an in accordance with an embodiment. The analysis system 10 may also include an illumination source and associated optics 20, which provide illumination to a target which is then imaged by the multi-channel imaging system 1000. Generally, the illumination source may include wavelength range(s) for visualization of the target (not limited to visible wavelengths) and wavelength range(s) for additional information about the target. Details of specific examples of this general system, as well as specific optical elements, will be discussed in detail with respect to FIGS. 3, 6 and 7.

The multi-channel imaging system 1000 includes a common objective lens 1010 and a beam splitter region 1020. The beam splitter region 1020 may include at least one dichroic beam splitter. The beam splitters in region 1020 divide the beam from the common objective lens 1010 into multiple, here three, channels, and may include more than one element. These three channels illustrate different types of typical channels that may be employed in the multi-channel imager 1000.

A first channel 1100 receives light of a first wavelength band and includes optical elements 1110 and a first channel aperture 1120, collectively, a first channel optical system, and an image sensor 1190. The aperture 1120 may be before, among, or after the optical elements 1110 depending on the optical design.

A second channel 1200 receives light of a second wavelength band and includes optical elements 1210 and a second channel aperture 1220. The light of the second wavelength band is then split by a beamsplitter 1230 to create multiple sub-channels, here two sub-channels, each receiving sub-bands of the second wavelength band. A first sub-channel 1240 receives partially filtered light from the beamsplitter 1230 and includes additional optical elements 1242 and a sensor 1244. A second sub-channel 1250 receives partially filtered light from the beamsplitter 1230 and includes additional optical elements 1252 and a sensor 1254. All elements in the second channel 1200 other than the sensors 1244, 1254 collectively form a second channel optical system. The second channel aperture 1220 may be before, among, or after the optical elements 1110 depending on the optical design.

A third channel 1300 receives light of a third wavelength band and includes optical elements 1310 and a third channel aperture 1320. The light of the third wavelength band is then split by a beamsplitter 1330 to create multiple sub-channels, here two sub-channels, each receiving sub-bands of the third wavelength band. A first sub-channel 1340 may include a rejection filter 1346 to eliminate any unwanted wavelengths that were transmitted by the beamsplitter 1330 to the first sub-channel 1340. The first sub-channel 1340 then transmits the fully filtered light to additional optical elements 1342 and a sensor 1344. A second sub-channel 1350 receives partially filtered light from the beamsplitter 1330 and includes additional optical elements 1352 and a sensor 1354. All elements in the third channel 1300 other than the sensors 1344, 1354 collectively form a third channel optical system. The third channel aperture 1320 may be before, among, or after the optical elements 1310 depending on the optical design.

As indicated in FIG. 1, the beamsplitter 1020 is provided in an optimal region for wavelength dependent beam splitting. When the beam splitter 1020 includes a dichroic element, the optimal region may be realized when 1) field dependent ray bundles transmitted by the common objective lens 1010 have near parallel cones and 2) a marginal ray having the largest cone angle is within the acceptance angle for the beamsplitter 1020.

FIGS. 2A and 2B illustrate constraints on the rays that occur in the region where the dichroic beam splitter 1020 is inserted for splitting wavelength bands. FIG. 2A illustrates the position and direction for the chief rays after the common objective lens 1010, here illustrated as a triplet. The remaining lenses ("channel optics") and the sensor in FIGS. 2A and 2B are in respective channels. Ray 1 indicates the chief ray for an on-axis field position and Rays 2 and 3 indicate the chief rays for extreme off-axis field positions, with remaining chief rays being between Rays 2 and 3. By having the chief rays for all field positions be near-parallel in the region where the dichroic is inserted, the dichroic reduces or eliminates reflection or transmission dependencies associated with object field positions (such as may cause a variation of hue at the image plane). Increased parallelism may be achieved by increasing the distance between the lens elements before and after the dichroic beam splitter 1020. In other words, the chief rays become more parallel as the space between the common objective lens 1010 and the beam splitter 1020 increases. This may result in more power in the common objective lens 1010, here a negative triplet, and a larger, i.e., in diameter, first lens element in the channel optics, here a doublet.

As may be seen in FIG. 2A, the chief rays 1, 2, 3, from the common objective lens 1010, are made sufficiently parallel that the ray bundles are effectively similar enough with respect to the dichroic beam splitter 1020 specifications. The dichroic beam splitter 1020 is specified according to various reflection and transmission characteristics across various wavelength ranges. However, another set of parameters concern incident beam angle and cone half angle.

Referring to FIG. 2B, a comparison is now made for equivalent marginal rays. The upper marginal ray for the upper field position is labeled 1a. The upper marginal ray for the lower field position is labeled 2a. Their angles relative to the optical axis are labeled 1b and 2b respectively. The larger of these two angles is equal to or less than the defined half cone angle for the incident beam specification for the dichroic beam splitter 1020.

The prescription in Table 1 below provides an example solution for the design form meeting the constraints noted above. Other solutions may be provided, as multiple solutions will fulfill the same requirements of the design form as summarized above in the Overview.

TABLE 1

SURFACE DATA SUMMARY:

| Surf | Type | Radius | Thickness | Glass | Diameter |
|---|---|---|---|---|---|
| OBJ | STANDARD | Infinity | 302 | | 248.9714 |
| 1 | STANDARD | Infinity | 3 | S-BSL7 | 32 |
| 2 | STANDARD | Infinity | 5 | | 32 |
| 3 | STANDARD | 101.606 | 7 | S-BSL7 | 32 |
| 4 | STANDARD | −29.58 | 4 | S-LAH58 | 32 |
| 5 | STANDARD | 29.418 | 6 | S-FSL5 | 32 |
| 6 | STANDARD | 29.418 | 13 | | 24 |
| 7 | STANDARD | Infinity | 115.0001 | | 20.50693 |
| 8 | STANDARD | 56.411 | 6.999869 | S-NPH2 | 42 |
| 9 | STANDARD | 67.335 | 6 | S-FPL51 | 42 |
| 10 | STANDARD | −217.781 | 2.000131 | | 42 |
| 11 | STANDARD | Infinity | 34.99998 | | 31.06787 |
| STO | STANDARD | Infinity | 2 | | 19.72486 |
| 13 | STANDARD | 21.461 | 7.8 | S-FPL51 | 26 |
| 14 | STANDARD | −35.553 | 3 | S-NPH2 | 26 |
| 15 | STANDARD | Infinity | 2.55 | | 26 |

TABLE 1-continued

SURFACE DATA SUMMARY:

| Surf | Type | Radius | Thickness | Glass | Diameter |
|---|---|---|---|---|---|
| 16 | STANDARD | 19.887 | 5 | S-TIM5 | 24 |
| 17 | STANDARD | 19.687 | 24.03853 | | 20 |
| 18 | STANDARD | Infinity | 0.03 | | 6.045877 |
| IMA | STANDARD | Infinity | | | 6.035214 |

Herein, the specific prescription of Table 1 is referenced for the purpose of illustrating the form. Other variations of this form exist. Lens design and filter selection may be simplified or become more complex if the operating space and/or the performance requirements change.

Example 1

Figure 3:
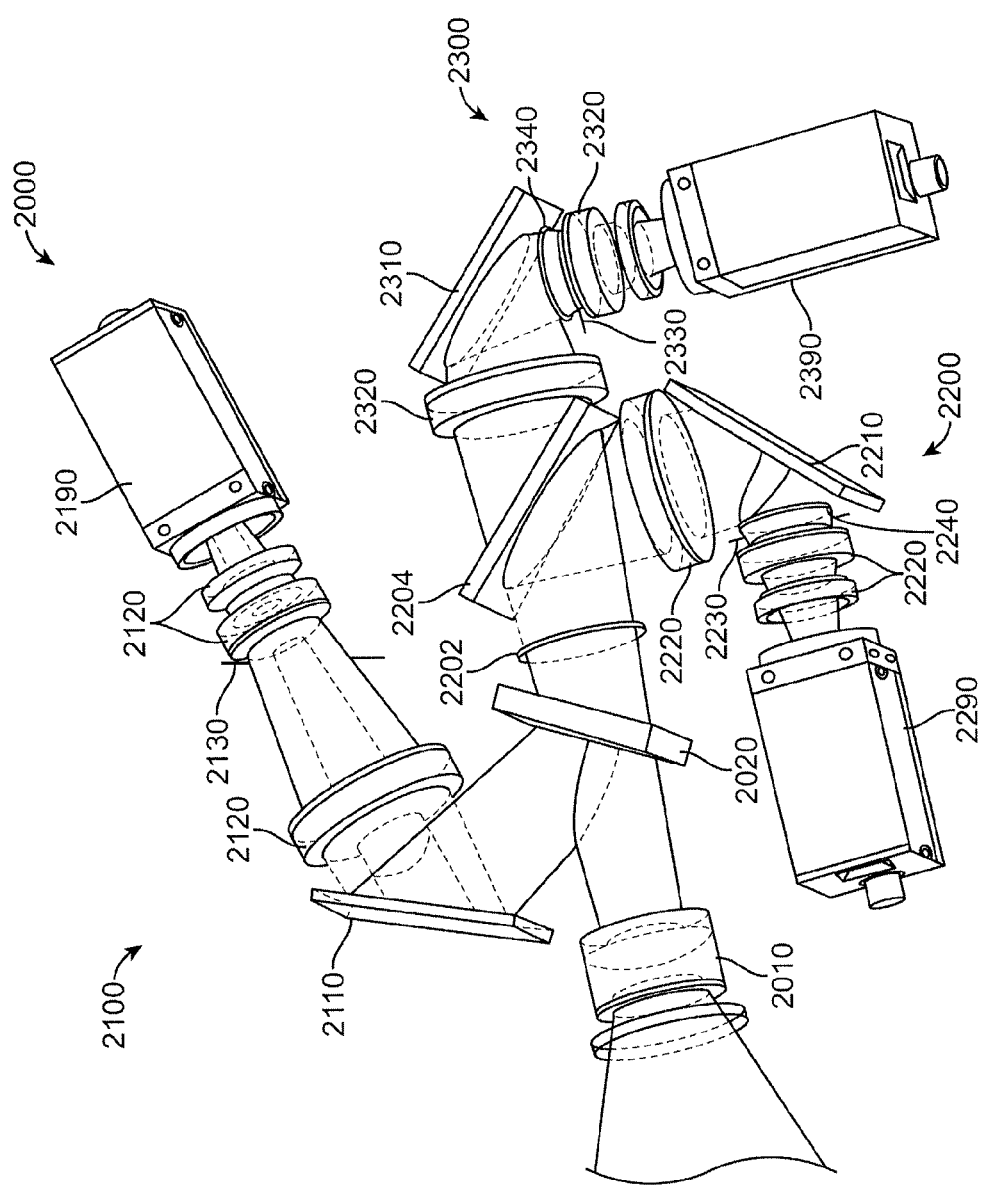
FIG. 3 illustrates a multi-channel wide field imaging system according to an embodiment.

FIG. 3 illustrates a wide field imaging system 2000 according to an embodiment. The wide field imaging system 2000 includes a common objective lens 2010, a beam splitter 2020, a first channel 2100, a second channel 2200, and a third channel 2300. The prescription of Table 1 may be used with this embodiment.

Light from an object field enters the common objective lens 2010, here illustrated as a triplet lens. The beam splitter 2020, e.g., a dichroic element, splits the light into two wavelength bands. In this particular example, the beam splitter 2020 reflects a first wavelength range to the first channel 2100, and transmits a second wavelength range to the second and third channels. In this particular embodiment, the first wavelength range is more intense than the second wavelength range.

The first channel 2100 may include a mirror 2110 for redirecting the light towards lenses 2120, an aperture stop 2130, and a detector 2190.

The second and third channels 2200, 2300 are split respectively by another beam splitter 2204, e.g., a dichroic element, into longer and shorter wavelength ranges within the second wavelength range. A rejection filter 2202 may be positioned before the beam splitter 2204 in case some light of the first wavelength range was transmitted by the beam splitter 2020 into the second and third channels.

Each of the second and third channels 2200, 2300 may include a mirror 2210, 2310 for redirecting the light towards a detector 2290, 2390, optical elements 2220, 2320, and an aperture stop 2230, 2330. Each of the second and third channels may include rejection filters 2240, 2340.

When a target being imaged by the imaging system 2000 has been illuminated by laser light and fluoresces in response to the laser light, e.g., the imaging system is used in open field surgery or clinical assessments, the first wavelength range may include visible light and the laser light, and the second wavelength range may include fluorescent light. The first wavelength range has shorter wavelengths and brighter light than the second wavelength range, e.g., the second wavelength range may include near infrared (NIR) light that is one or more, e.g., four or five, orders of magnitude fainter than light in the first wavelength range. The second wavelength range may be split into shorter NIR for the second channel 2200 and longer NIR for the third channel 2300.

As noted above in the Overview, the optical elements may have identical lens prescriptions within the channels. As used herein, identical lens prescriptions mean that the lens materials and lens geometries are the same regardless of associated wavelength range or channel. However, air to glass coatings may be identical or may be wavelength range dependent.

Figure 4:
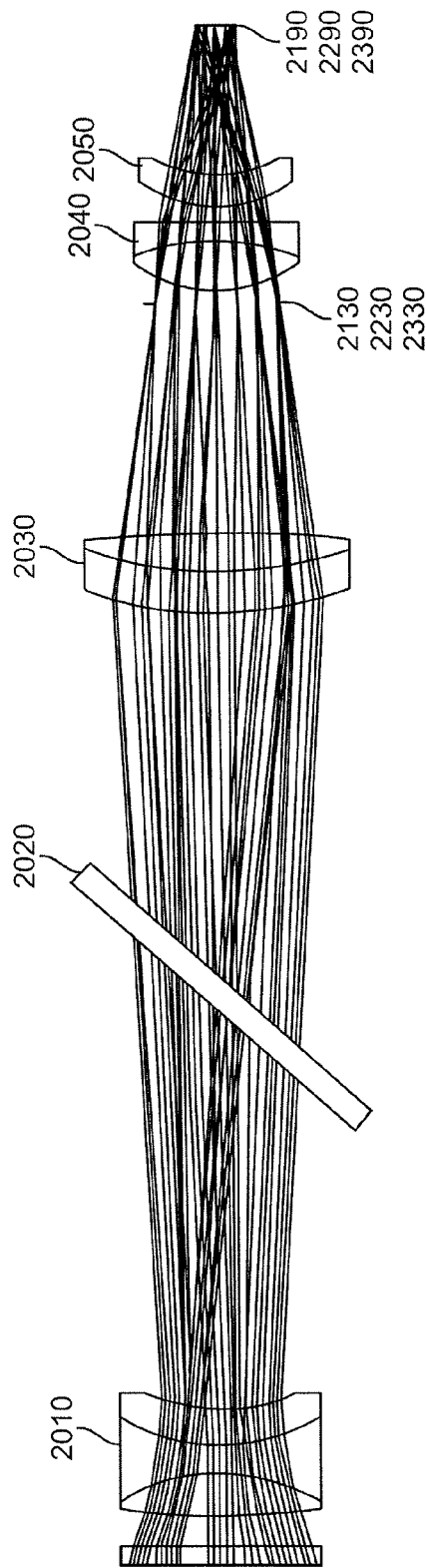
FIG. 4 illustrates a lens solution for the imaging system of FIG. 3.

As shown in FIG. 4, light from the common objective lens 2010 and split by the beam splitter 2020, is incident on lenses 2030, 2040, and 2050, and passes through respective aperture stops 2130, 2230, 2330 before being incident on respective image sensors 2190, 2290, 2390. In the particular design shown herein and detailed above in Table 1, lenses 2030 and 2040 are doublets with the aperture stop being before the doublet 2040. The faint signal in the second and third channels may have a relatively larger aperture stop, e.g., an f/2 stop, while the stronger signal may have a smaller aperture stop, e.g., an f/5.6 stop. The final lens 2050 may be a negative meniscus lens. In other words, an open area of the aperture stop may be larger for the lower intensity light than an open area of the aperture stop for the higher intensity light.

The channel lenses 2030, 2040, and 2050 may have a net positive power such that, in combination with the common objective lens 2010, each optical system will have a retro-focus form, i.e., the forward group has negative power, the rear group has positive power, and the back focal length exceeds the effective focal length. Further, the channel lenses 2030, 2040, and 2050, in combination with the common objective lens 2010, may be image space telecentric, such that images produced at the respective sensors 2190, 2290, 2390 may have a same size regardless of axial color or the axial position of best focus at the sensors. Ray cones approaching the sensor have the same angle of incidence and angular subtense, i.e., the image space is telecentric or near-telecentric, and the beam passing through the system is unvignetted, everywhere in the image plane, the image is evenly illuminated.

Figure 5A:
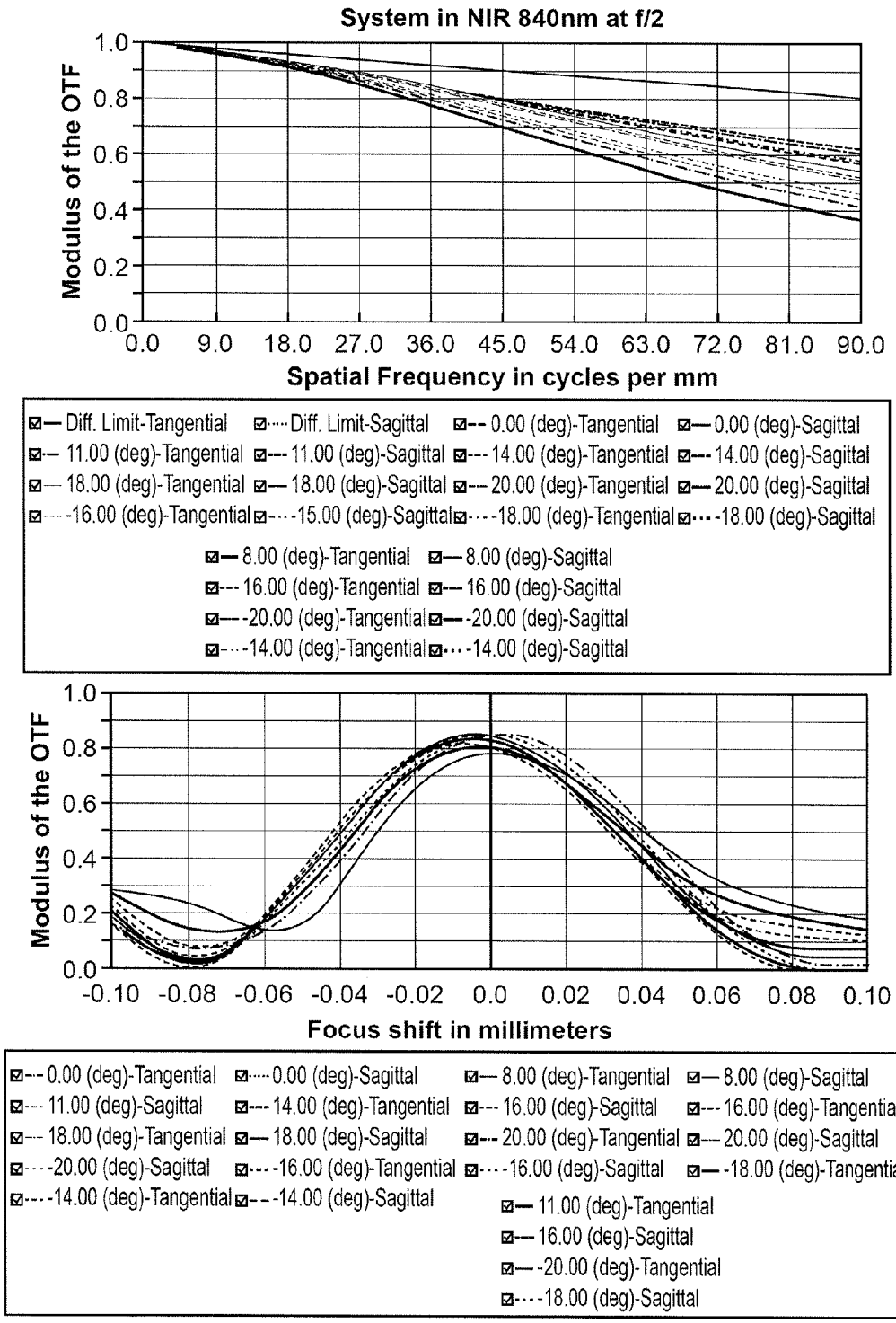
FIGS. 5A to 5C illustrate performance at different wavelength ranges in the imaging system of FIG. 3.
Figure 5B:
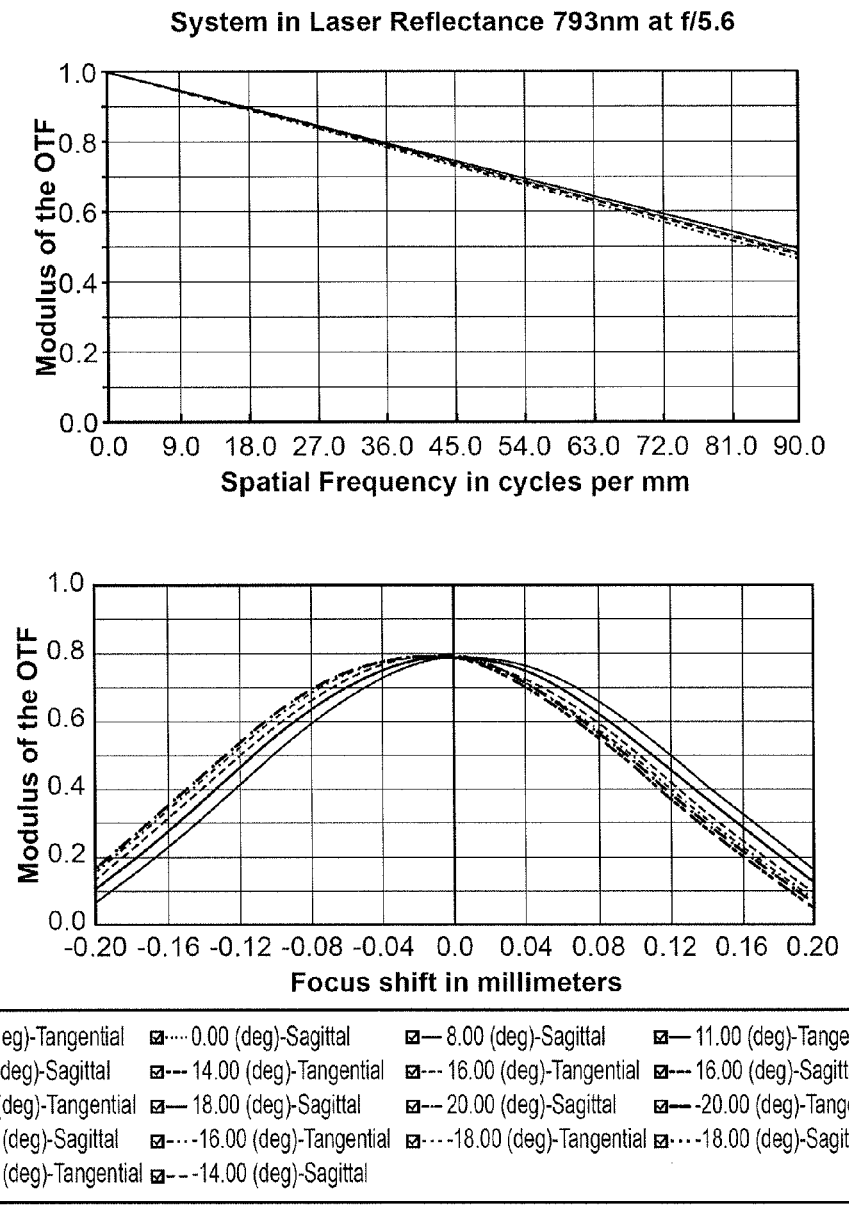
Figure 5C:
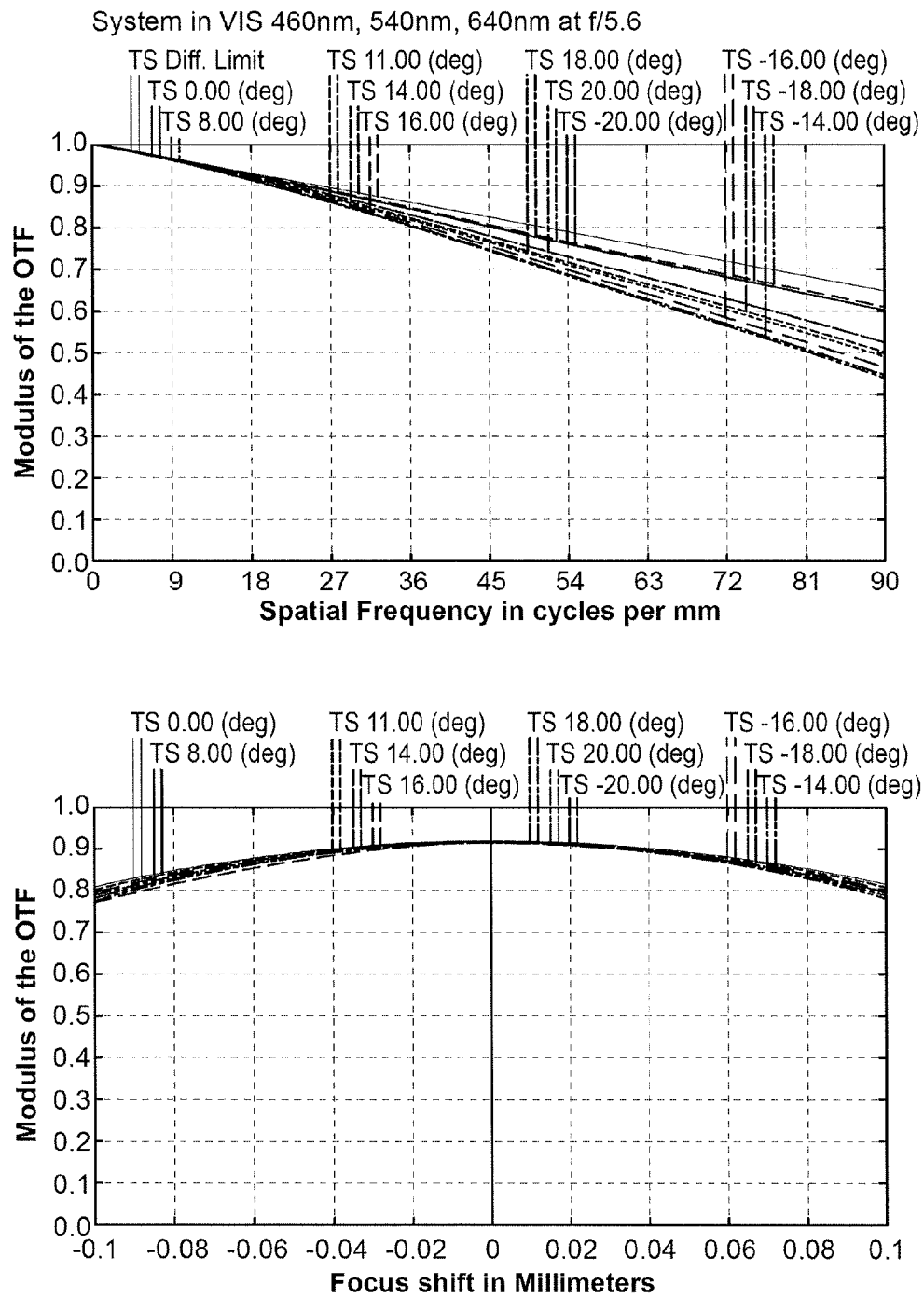

FIGS. 5A to 5C illustrate the spatial frequency versus MTF and through-focus MTF for the NIR, laser reflectance, and visible light in the imaging system 2000 of FIG. 3. As may be seen therein, the design specified by the parameters in Table 1 allows channels to operate f/2 or higher, with a full field view of 40 degrees, and in the spectral region from 460 nm to 900 nm. The prescription may be modified and optimized to include other wavelengths, other fields of view, other f-numbers, and so forth, which satisfy the conditions outlined above in the Overview.

Example 2

Figure 6:
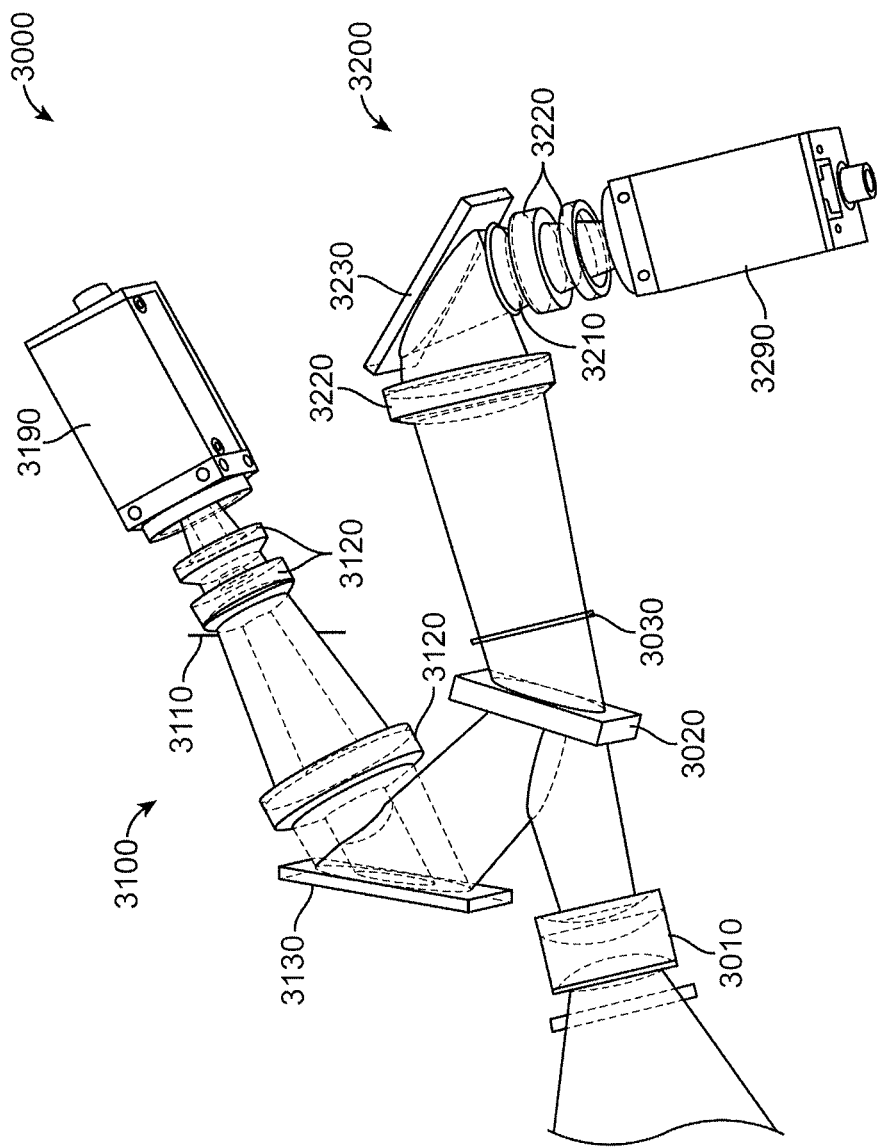
FIG. 6 illustrates a multi-channel wide field imaging system according to an embodiment.

FIG. 6 illustrates a wide field imaging system 3000 according to an embodiment. The wide field imaging system 3000 includes a common objective lens 3010, a beam splitter 3020, a first channel 3100, and a second channel 3200. The prescription of Table 1 may be used with this embodiment. The first channel includes a mirror 3130, optical elements 3120, a first aperture stop 3110, and a sensor 3190. The second channel includes a rejection filter 3030, a mirror 3230, optical elements 3220, a second aperture stop 3210, and a sensor 3290.

When a target being imaged by the imaging system 3000 has been illuminated by laser light, backscattered light will form a random interference pattern, i.e., a speckle pattern. When there is movement in the target, the speckle pattern changes. Here, the first wavelength range may include visible light and the second wavelength range may include laser light. Here, the beam splitter 3020 separates the light from the common objective lens 3010 into the visible wavelength range for the first channel 3100 and the laser wavelength range for the second channel 3200. The aperture stop 3110 in the first channel may have a simple geometry, i.e. a circle, square, or polygon, as is generally the case, while the aperture stop 3210 in the second channel may have an aperture for use with speckle imaging, e.g., a Fourier aperture.

Example 3

Figure 7:
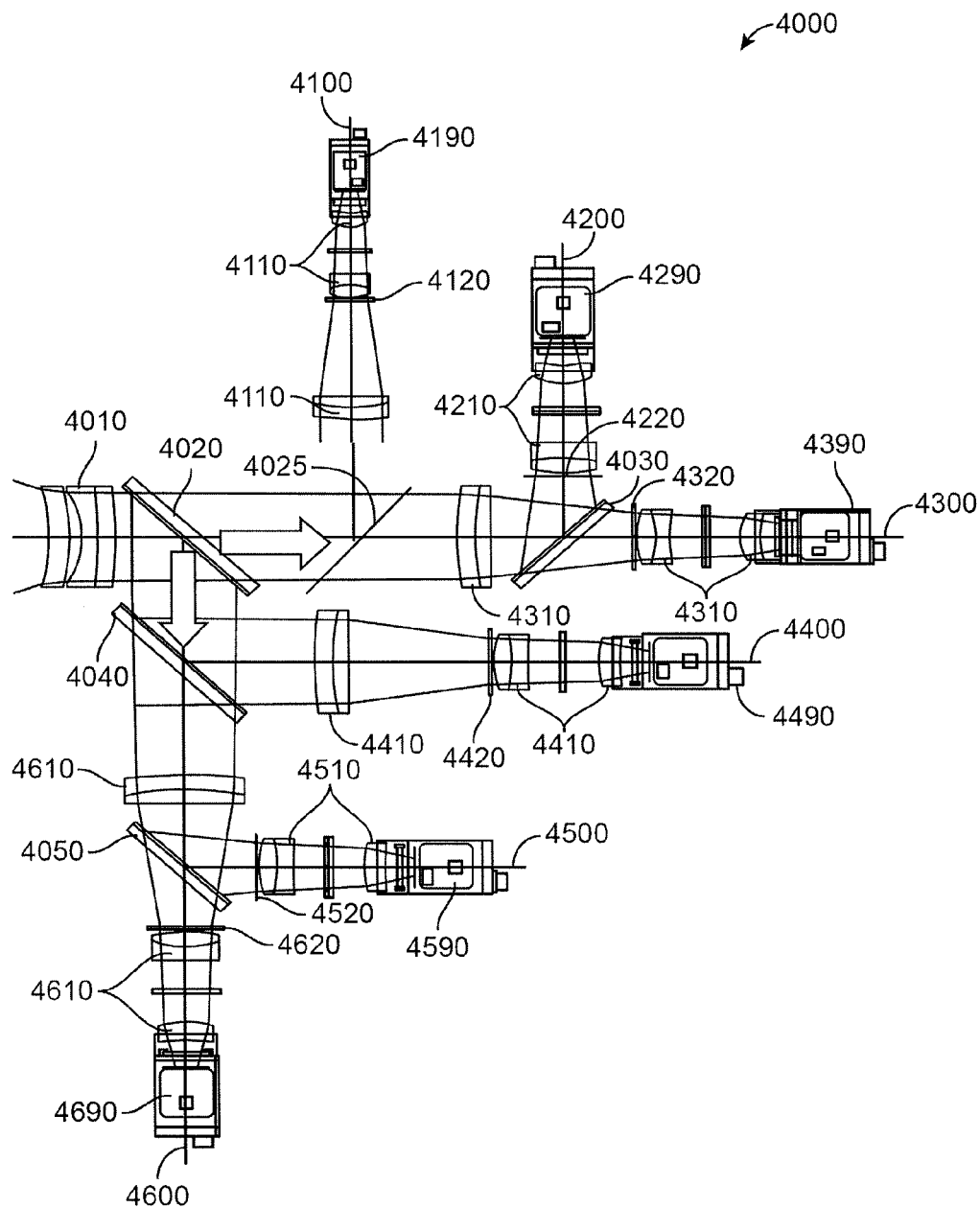
FIG. 7 illustrates a multi-channel wide field imaging system according to an embodiment.

FIG. 7 illustrates a wide field imaging system 4000 according to an embodiment. The wide field imaging system 4000 includes a common objective lens 4010, beam splitters 4020, 4025, 4030, 4040, 4050 a first channel 4100, a second channel 4200, a third channel 4300, a fourth channel 4400, a fifth channel 4500, and a sixth channel 4600. The prescription of Table II may be used with this embodiment.

TABLE II

SURFACE DATA SUMMARY:

| Surf | Type | Radius | Thickness | Glass | Diameter |
|---|---|---|---|---|---|
| OBJ | STANDARD | Infinity | 275 | | 284.742 |
| 1 | STANDARD | Infinity | 25 | | 84.98343 |
| 2 | STANDARD | 105.634 | 14 | H-ZF2 | 70 |
| 3 | STANDARD | −152.62 | 10 | H-ZLAF68 | 70 |
| 4 | STANDARD | 47.345 | 195.797 | | 56 |
| 5 | STANDARD | Infinity | 0 | | 29.04034 |
| 6 | STANDARD | 80.474 | 11 | H-LAK7 | 56 |
| 7 | STANDARD | Infinity | 43.10923 | | 56 |
| 8 | STANDARD | Infinity | 0 | | 11.0272 |
| STO | STANDARD | Infinity | 1 | | 11.0272 |
| 10 | STANDARD | 33.56 | 12 | H-ZBAF1 | 32 |
| 11 | STANDARD | −59.932 | 6.7 | H-ZF62 | 32 |
| 12 | STANDARD | 184.9 | 25.26662 | | 28 |
| 13 | STANDARD | Infinity | 0 | | 14.71796 |
| 14 | STANDARD | 25.00024 | 9.5 | H-ZLAF68 | 24 |
| 15 | STANDARD | 25 | 7.118885 | | 18 |
| 16 | STANDARD | Infinity | 0.05 | | 13.18883 |
| IMA | STANDARD | Infinity | | | 13.2167 |

The imaging system 4000 may image fluorescence, laser speckle, laser reflectance, and white light. A first beam splitter 4020 may transmit high flux light and reflect low flux light.

The high flux light is incident on a second beam splitter 4025, which may or may not include a dichroic element, that reflects the visualization wavelengths into the first channel 4100 including lenses 4110, an aperture stop 4120, and a sensor 4190. The second beam splitter 4025 transmits the laser reflectance and laser speckle light to a third beam splitter 4030, which reflects the laser reflectance light to the second channel 4200 and transmits the laser speckle light to the third channel 4300. The second channel 4200 includes lenses 4210, an aperture stop 4220, and a sensor 4290. The third channel includes lenses 4310, an aperture stop 4320, and a sensor 4390. A first lens of the second and third channels 4200, 4300 may be before the third beam splitter 4030, such that the first lens is shared, i.e., may be a common lens to both channels 4200, 4300.

The low flux light is incident on a fourth beam splitter 4040 that reflects visible fluorescence light to the fourth channel 4400 and transmits NIR fluorescence light. The fourth channel includes lenses 4410, an aperture stop 4420, and a sensor 4490. A fifth beam splitter 4050 reflects the shorter wavelength NIR fluorescence light and transmits the longer wavelength NIR light. The fifth channel 4500 includes lenses 4510, an aperture stop 4520, and a sensor 4590. The sixth channel includes lenses 4610, an aperture stop 4620, and a sensor 4690. A first lens of the fifth and sixth channels 4500, 4600 may be before the fifth beam splitter 4050, such that the first lens is shared, i.e., may be a common lens to both channels 4500, 4600.

By way of summation and review, one or more embodiments may provide wavelength-dependent channels that facilitate simultaneous imaging of spectral regions having intensities that differ by order(s) of magnitude; as-detected resolution and contrast that are substantially constant across the field of view, such that superimposition is useful; and/or reduce or eliminate chromatic cross-talk across some or all of the sensors.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An optical system for use with a multi-channel wide field imaging system, the optical system comprising:
    an objective lens;
        a dichroic element to split light into a first wavelength range and a second wavelength range, the dichroic element positioned to receive near parallel chief rays from the objective lens;
        a first channel lens system to receive light of the first wavelength range from the dichroic element; and
        a second channel lens system to receive light of the second wavelength range from the dichroic element, wherein
        the first wavelength range is in the visible region and the second wavelength range is outside the visible region, and
        lens elements of the first and second channel lens systems have identical lens prescriptions.

2. The optical system as claimed in claim 1, wherein the objective lens is to output marginal rays that are within a cone half angle requirement for the dichroic element.

3. The optical system as claimed in claim 1, wherein the first wavelength range and the second wavelength range have intensities that differ by at least one order of magnitude.

4. The optical system as claimed in claim 3, wherein the second wavelength range has a lower intensity than the first wavelength range and an aperture stop of the second channel lens system is larger than an aperture stop in the first channel lens system.

5. The optical system as claimed in claim 1, wherein the dichroic element is before a limiting aperture in the optical system.

6. The optical system as claimed in claim 5, wherein the first and second channel lens systems have separate and independent limiting apertures.

7. The optical system as claimed in claim 1, wherein the first and second channel lens systems, in combination with the common objective lens, have a retro-focus form.

8. The optical system as claimed in claim 1, wherein the optical system is image space telecentric or near telecentric.

9. The optical system as claimed in claim 1, further comprising another dichroic beam splitter in one of the first and second channel lens systems outputting light to a third channel lens system.

10. The optical system as claimed in claim 9, wherein lenses in the first channel lens system, in the second channel lens system, and in the third channel lens system have identical lens prescriptions.

11. The optical system as claimed in claim 10, wherein each of the second channel lens system and the third channel lens system has an aperture stop that is larger than an aperture stop in the first channel lens system, aperture stops for the second and third channel lens systems having a same size.

12. The optical system as claimed in claim 1, wherein an aperture stop of the first channel lens system is different from an aperture stop of the second channel lens system.

13. The optical system as claimed in claim 12, wherein the aperture stop of the first channel lens system is smaller than the aperture stop of the second channel lens system.

14. The optical system as claimed in claim 12, wherein the aperture stop of the first channel lens system is an opening having simple geometry and the aperture stop of the second channel lens system is a Fourier aperture.

15. An imaging system, comprising:
    an optical system as claimed in claim 1; and
    respective image sensors in respective channels to detect corresponding wavelength ranges in each channel lens system.

16. A kit, comprising:
    an objective lens;
    a dichroic element to split light into a first wavelength range and a second wavelength range;
    a first channel lens system to receive light of the first wavelength range; and
    a second channel lens system to receive light of the second wavelength, the first and second channel lens systems having identical lens prescriptions, wherein the first wavelength range is in the visible region and the second wavelength range is outside the visible region.

17. The kit as claimed in claim 16, wherein an aperture stop of the first channel lens system is different from an aperture stop of the second channel lens system.

18. The kit as claimed in claim 17, wherein the aperture stop of the first channel lens system is smaller than the aperture stop of the second channel lens system.

19. The kit as claimed in claim 17, wherein the aperture stop of the first channel lens system is an opening having simple geometry and the aperture stop of the second channel lens system is a Fourier aperture.

20. A method of imaging multi-channel wide field light, the method comprising:
    providing all light to be imaged incident on a common objective lens;
    splitting light from the common objective lens by a dichroic element into a first wavelength range and a second wavelength range, the dichroic element being in a position relative to the common objective lens such that the dichroic element receives sufficiently parallel chief rays;
    providing light of the first wavelength range from the dichroic element to a first channel; and
    providing light of the second wavelength range from the dichroic element to a second channel, wherein
    the first wavelength range is in the visible region and the second wavelength range is outside the visible region, and lens elements of the first and second channel lens systems have identical lens prescriptions.

* * * * *